June 25, 1957  F. MÜLLER  2,797,076
APPARATUS FOR HEATING PULVERULENT MATERIAL SUCH AS
CEMENT RAW MATERIAL
Filed Dec. 1, 1953  3 Sheets-Sheet 1

INVENTOR.
Franz Müller

June 25, 1957 F. MÜLLER 2,797,076
APPARATUS FOR HEATING PULVERULENT MATERIAL SUCH AS
CEMENT RAW MATERIAL Filed Dec. 1, 1953 3 Sheets-Sheet 2

INVENTOR.
Franz Müller

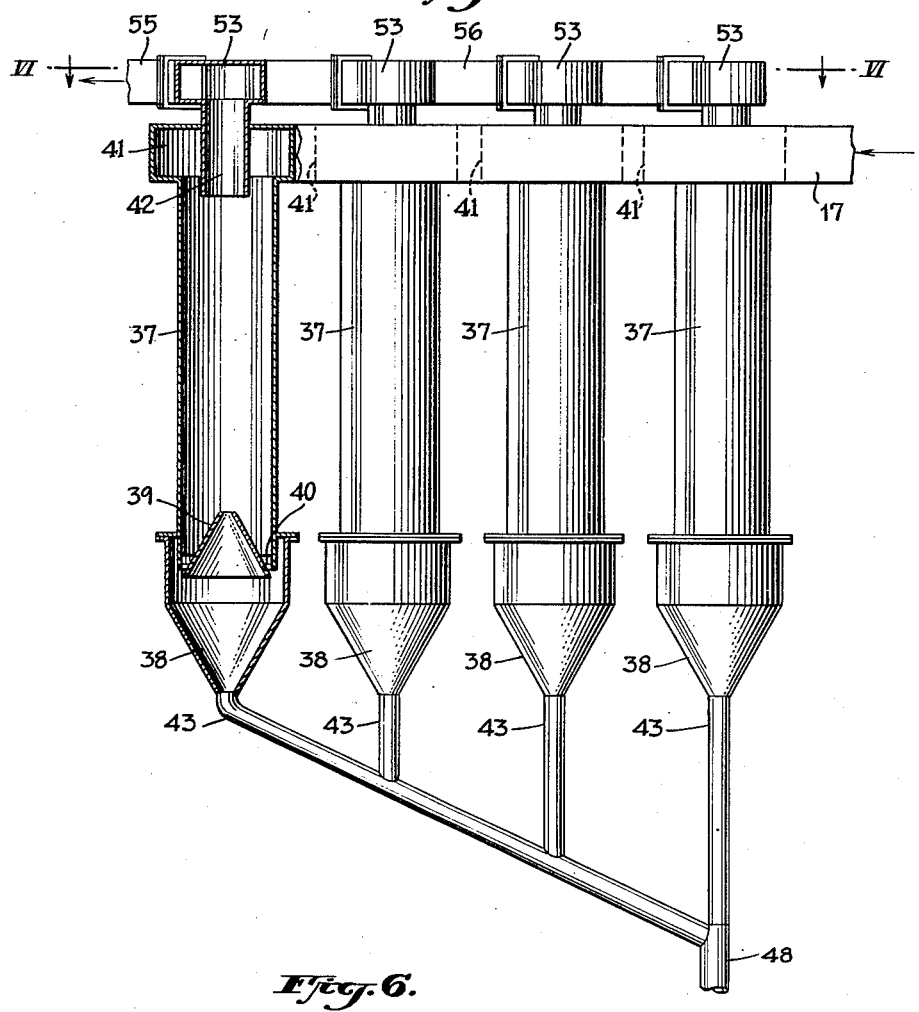
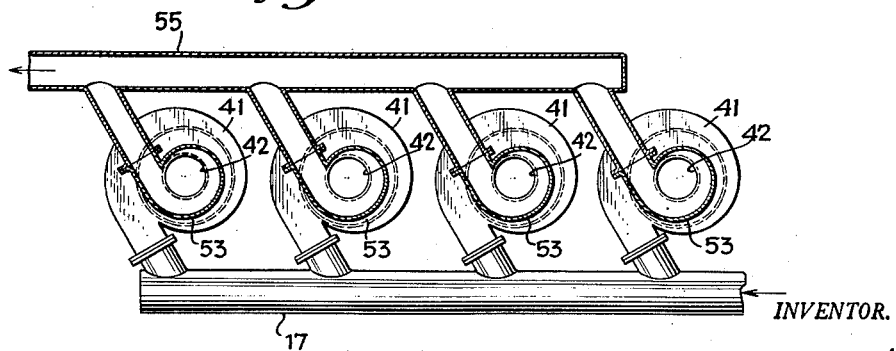

United States Patent Office 2,797,076
Patented June 25, 1957

2,797,076

APPARATUS FOR HEATING PULVERULENT MATERIAL SUCH AS CEMENT RAW MATERIAL

Franz Müller, Refrath, Bezirk Koln, Germany, assignor to Klöckner-Humboldt-Deutz Aktiengesellschaft, Koln-Deutz, Germany, a corporation of Germany Application December 1, 1953, Serial No. 395,547

Claims priority, application Germany December 4, 1952

5 Claims. (Cl. 263—32)

My invention relates to apparatus for heating pulverulent or granular materials and, more particularly, to heat exchangers for preheating cement raw material by the heat contained in the exit gases from a rotary kiln to which the material is being supplied.

One of the known apparatus for the preheating of cement raw material by exit gases from a rotary kiln comprises a number of serially interconnected cyclone-type heat exchangers designed and operated in the manner of rotary-gas-flow dust separators. The kiln gases are forced through these separators by a blower and the material to be heated is passed through the cyclones in counterflow to the gases. The known system includes long vertical gas conduits extending from one separator to the next higher separator resulting in an installation of considerable height.

It is an object of my invention to provide a novel apparatus for preheating cement raw material that, while retaining all advantages of the known cyclone-type exchangers, permits greatly reducing the overall height of the installation.

To this end, and in accordance with a feature of my invention, I arrange the serially interconnected separators in two substantially vertical rows and mount each two separators of the respective rows at approximately the same elevation so that each of the two separators has most of its vertical height located in overlapping relation to the height of the other separator; and I further let the gas outlet conduit of one of these two separators extend substantially horizontally to the gas inlet opening of the other separator at a height substantially between the respective tops of the two separators.

According to another, more specific feature of my invention I divide the above-mentioned gas outlet conduit into a short vertical portion adjacent to the gas outlet opening of one separator and a long horizontal portion leading to the gas inlet opening of the other separator; and I interpose between the two conduit portions a vortex head substantially in coaxial relation to the first-mentioned separator.

According to further specific features of a plant embodying my invention, each gas-from-dust separator of the two vertical rows has a lateral gas inlet, a vertical gas outlet, and a material discharge pipe extending downwardly from the bottom of the separator. A gas conduit extends from the kiln, the source of hot gas, upwardly to the gas inlet of the lowermost separator. The lowermost separator is provided at its vertical gas outlet with a vortex head to permit a second gas conduit to extend horizontally from the lowermost separator to the gas inlet of a second separator. The vertical gas outlet of the second separator is connected by a third gas conduit to the gas inlet of a third separator. The third separator is provided at its vertical gas outlet with a vortex head to permit a fourth gas conduit to extend horizontally to a fourth separator. The gas outlet of the fourth separator is connected with a dust collection system and a suction blower to induce the flow of hot gases from the kiln serially through the separators. A raw-material supply pipe discharges into the fourth gas conduit entering the gas intake of the fourth separator; and the material discharge pipe of each of the separators, except the lowermost separator, discharges into the gas inlet conduit of the next lower separator. The material discharge pipe of the lowermost separator discharges into the kiln as a means of supplying raw material feed to the kiln. The material supply pipe and each of the material discharge pipes are provided with a dust trapping or sealing means to prevent the gas from entering the pipe and thereby creating a short circuit of gas flow through the separators.

The invention will be more fully understood in conjunction with the following description of the system for preheating cement raw material shown on the accompanying drawings, in which:

Fig. 5 is a side elevation, partly in section, of the dust collecting system, and Fig. 6 is a top plan view, partly in section, of the dust collecting system.

Figure 1:
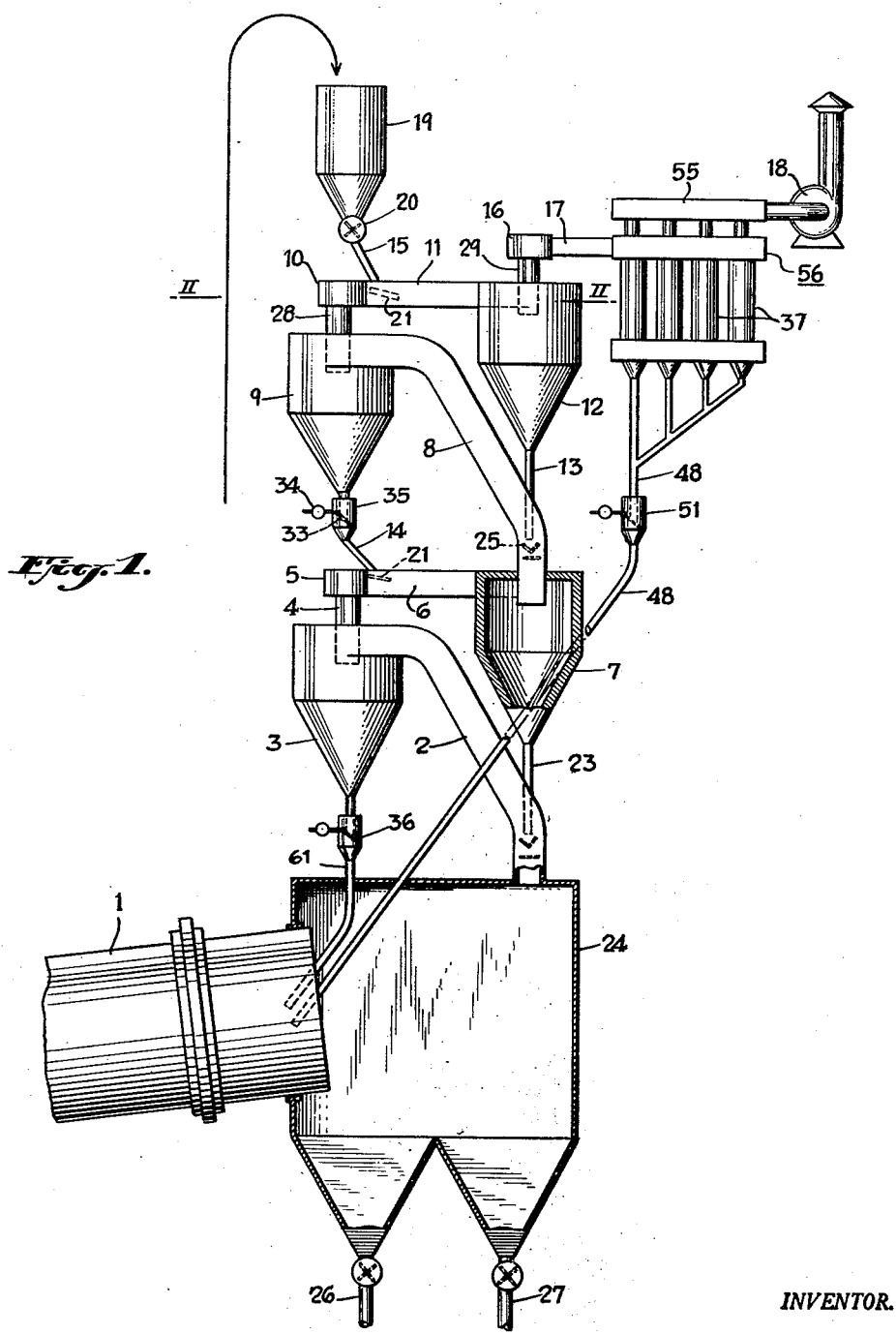
Fig. 1 is a schematic diagram of the apparatus.

As shown in Fig. 1, the feed end of a rotary cement kiln 1 is provided with a dust chamber 24 having dust discharge outlets 26 and 27. Mounted above the dust chamber 24 are four centrifugal separators of the rotary cyclone type 3, 7, 9 and 12. These separators are arranged in two vertical rows in such a manner that the two cyclones 3 and 7 and the two cyclones 9 and 12 are in approximately the same elevation. That is, most of the vertical height of each separator 3 and 9 overlaps most of the height of respective separators 7 and 12. As shown, the vertical spacing between the two separators of the same row may be smaller than the height of an individual separator.

A gas conduit 2 extends from the dust chamber 24 to the separator 3 where it enters tangentially into the top portion of the separator. Separator 3 is provided with a vertical gas outlet conduit 4 on which is positioned a vortex head 5 for efficiently changing the direction of the gas flow. A gas conduit 6 extends from vortex head 5 to the separator 7 where it connects tangentially with the top portion of the separator. The horizontal gas conduit 6 is preferably given a rectangular or substantially square cross section to permit a smooth flow of gas from the vortex head 5 and to provide a nonturbulent gas entrance into the cyclone 7 in a tangential manner without utilizing a transition connection. A gas conduit 8 extends upwardly from the gas outlet of separator 7 to the gas inlet of separator 9. Separator 9 is provided with a vertical gas outlet 28 and a vortex head 10 in the same manner as the separator 3. A gas conduit 11 of rectangular cross section extends from vortex head 10 to separator 12 where it connects in a tangential manner as described for the gas conduit 6. A vertical gas outlet conduit 29 extends from the separator 12 to a vortex head 16 also as described for separators 3 and 9. A conduit 17 extends from the vortex head 16 to a dust collecting system 56.

Figure 2:
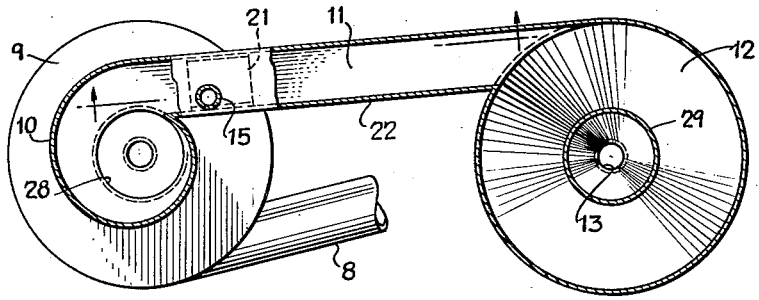
Fig. 2 is a top plan view, in section, of a gas conveying conduit; the section being taken along the horizontal plane denoted by II—II in Fig. 1.
Figure 3:
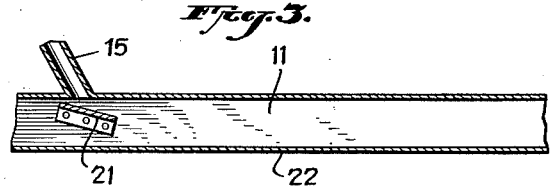
Fig. 3 is a side elevation, in section, of the same gas conveying conduit.

A raw-material supply bin 19 positioned above the gas conduit 11 is provided with a feed regulator 20 which comprises a segment wheel and serves also as a sealing device. A material supply pipe 15 extends from regulator 20 into the gas conduit 11. Referring to Fig. 2 and Fig. 3, a material distribution plate 21 is positioned across the gas conduit 11 beneath the discharge opening of supply pipe 15. The supply pipe 15 enters the gas conduit 11 at an off-center position opposite the tangential discharge side of the vortex head 10. This off-center position of pipe 15 prevents an accumulation of material on the tangential discharge side of vortex head 10 and conduit 11, and also provides for a more evenly distributed dust load in the gas conduit 11. Any dust entrained in the gas discharging from the separator 9 through the vertical discharge outlet 28 will be thrown to the outer sidewall of the vortex head 10 by centrifugal force and will enter the gas conduit 11 in that location. The dust loading therefore will be greater on the tangential side of the gas conduit 11 and the velocity will be less than the velocity of the gas stream entering the inward side of the conduit 11. As a result, the material is more evenly distributed throughout the conduit 11 by thus admitting the feed material off center; and the distribution plate 21 disperses the raw material into a form more suitable for entrainment in the gas stream.

Figure 4:
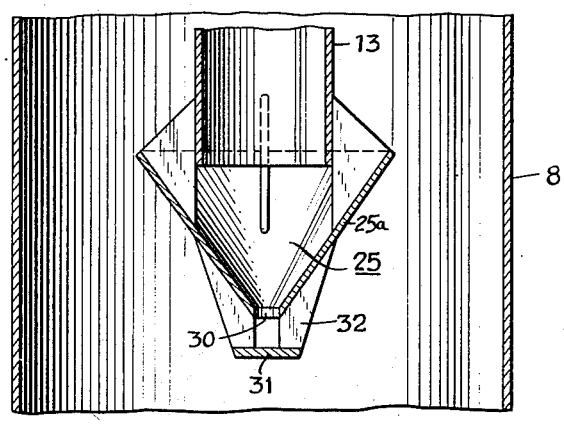
Fig. 4 is a sectional view of one form of discharge-pipe sealing means.

A material discharge pipe 13 extends from the bottom of separator 12 into the interior of the gas conduit 8 (Fig. 1). A seal structure 25 located in conduit 8 beneath the opening of pipe 13 prevents the gas flowing in conduit 8 from passing through the pipe 13. Details of the seal structure 25 are shown in Fig. 4. A funnel-shaped container 25a is positioned beneath the discharge opening of the material discharge pipe 13 and is provided with a bottom opening 30. A material distribution plate 31 directly beneath opening 30 is held in position by means of webs 32. The outlet of the material discharge pipe 13 is beneath the upper edge of the funnel container 25a. The material discharging from pipe 13 fills the funnel 25a and flows over the upper edge in a circular thin stream which is upwardly entrained in the gas stream flowing through the gas conduit 8. An effective gas seal is formed by the height of material above the discharge outlet of the pipe 13. The height of the discharge edge of funnel 25a is made adjustable with respect to the discharge end of pipe 13 to permit adjusting the degree of gas seal depending upon the different gas pressures that may obtain in conduit 8. The bottom opening 30 permits all of the material contained in the funnel 25a to discharge from the funnel during any period of non-operation of the system. This prevents setting of the cement raw material in the event any moisture comes in contact with the raw material during idle periods of the apparatus. A further purpose of the opening 30 is to permit any oversized particles to pass out of the sealing means if these particles are too large to be discharged over the upper edge of the funnel.

A material discharge pipe 14 extends from the bottom of separator 9 into the gas conduit 6 (Fig. 1) in the same manner as described for pipe 15 entering the gas conduit 11. The material discharge pipe 14 has an upper portion and a lower portion formed with each other by a sealing device 35 which prevents the gases in conduit 6 from by-passing through pipe 14 into the interior of the separator 9. The sealing device 35 comprises a housing enclosing a flap valve 33 that controls the slanted opening of the upper portion of discharge pipe 14. The flap valve 33 rotates about a pivot and is held in the closed position by a weight 34. The effective torque produced by weight 34 is in opposition to a head of material above valve 33 in pipe 14. The valve 33 will open to permit material to discharge from the separator 9 when the predetermined head of material in pipe 14 is sufficient to overcome that torque.

A material discharge pipe 23 extends from the bottom of separator 7 into the gas conduit 2 and is provided with a seal structure of the same design as described for seal 25. A material discharge pipe 61 extends from the bottom of separator 3 into the kiln 1 and is provided with a gas seal 36 of the same design as described for the sealing device 35.

The exhaust gas conduit 17 extends from vortex head 16 of separator 12 to the suction side of a blower 18 through the dust collecting system 56.

The dust collecting system comprises a group of cyclone-type separators of the same design. Hence only one of them need be described in detail. As shown in Fig. 5, the individual cyclone has a cylindrical housing 37 extending into a cylindrical cone 38. A truncated cone 39 extends into the cylindrical housing 37 in such a manner as to provide a discharge opening 40 in the bottom of housing 37. A dust discharge pipe 43 connects the bottom of cone 38 to a dust conveying line 48. The top of the cylindrical housing 37 carries a vortex head 41 (Figs. 5, 6) for the tangential entrance of the gases from the conduit 17 into the cyclone. A gas outlet conduit 42 extends from the interior of the cylindrical housing 37 and is provided with a vortex head 53 at the external end. The vortex head 53 discharges the gases into a gas conduit 55 which in turn is connected to the suction side of the blower 18 (Figs. 1, 6).

The dust removed from the exhausting gas stream in the dust collecting system passes through the conveying line 48 to the feed end of the kiln 1 (Fig. 1). A sealing device 51, of the same design as described for sealing device 35, is positioned in the dust conveying line 48 to prevent the kiln gases from by-passing the separators 3, 7, 9, 12 through the dust collecting system.

If preferred, the gas sealing means 25 of separator 12 or the gas sealing means for the separator 7 may be of the same design as that described for the gas sealing means 35 of separator 9 and separator 3. In a like manner, the sealing means 25 may be used in preference to the sealing means 35 for separator 9 or separator 3.

In the operation of the apparatus, the hot gases being exhausted by the blower 18 pass from the kiln 1 into the dust chamber 24. In chamber 24, a large portion of the dust being carried in the gas stream precipitates and drops to the bottom of the chamber 24 and is removed continuously, or intermittently if preferred through pipes 26 and 27. The hot gases leave the dust chamber 24 through the gas conduit 2 and pass at high velocity tangentially into the separator 3 thus being forced to vigorously rotate in the separator before the gases issue, still rotating, into the outlet conduit 4. The gases then reach the vortex head 5 and pass tangentially into the horizontal conduit 6 thus being subjected to a smooth and continuous change in course with a lesser degree of flow disturbance than occurring in an elbow and with the aid of structure of smaller height than required for an elbow. It is thus possible to give the two separators of the column a smaller vertical spacing than otherwise required.

From conduit 6, the gases pass serially through the separators 7, 9, 12 and the dust collector 55. The clean exhaust gases discharge through line 55 and blower 18 into the atmosphere.

The pulverulent cement raw material passes from bin 19 through the rotating feed-regulator seal 20 into pipe 15 and drop at a rather high velocity upon the distributing baffle plate 21 from which it is entrained in finely dispersed condition by the gas stream entering through conduit into the separator 12. The velocity of the gas stream is sufficiently high (for instance, about 80 to 100 feet per second) to prevent any material from accumulating in conduit 11. Since, as explained, most of the pulverulent particles travel along the inner wall 22 (Fig. 2) of conduit 11, these particles enter the separator 12 mainly on a tangential path near the wall 22. Due to centrifugal force, the particles, while whirling in the cyclone chamber of the separator, are gradually driven toward the circumferential wall of the separator thus being kept in intimate heat-exchanging relation to the gases. The particles then slide down along the separator wall into the discharge pipe 13. After passing through the gas seal at 25, the material discharged from pipe 13 is upwardly entrained by the gas stream in conduit 8 and passes into separator 9. The material, heated in separator 9 to a higher degree and again separated from the gas, then passes through sealing device 35 and pipe 14 into the gas conduit 6 to be gas-conveyed to separator 7. The high speed of the gas flow prevents any deposition of particles in conduit 6, and the particle flow conditions are the same as described above with reference to conduit 11 and separator 12. The material separated in separator 7 passes through pipe 23 into conduit 2 and is gas-conveyed into the separator 3 from which the material drains through pipe 61 into the kiln 1. The dust separated in the dust collecting system 56 is also conveyed to the kiln, passing through sealing device 51 and pipe 48.

It has been determined that the primary heat exchange for the cement raw material takes place within the various cyclones, therefore the gas conveying ducts 2, 6, 8 and 11 can be kept relatively short. Preferably the cyclones and the gas conveying ducts, as well as the material discharge pipes, are provided with an insulating lining or covering to prevent heat losses.

Because of the horizontal arrangement of the ducts 6 and 11 a substantial reduction in the overall height of the apparatus is accomplished. This is especially of great advantage when the apparatus is to be installed in an existing building, or when local conditions such as poor foundation facilities make it desirable to erect the apparatus with low building heights.

It will be obvious to those skilled in the art, upon a study of this disclosure, that apparatus according to my invention may be modified as to structural design, arrangement, or number of the serially connected separators and hence may be embodied in plants different from the one specifically illustrated and described, without departing from the essential features of my invention and within the scope of the claims annexed hereto.

I claim:

1. Apparatus for heating pulverulent material, such as cement raw material, by hot kiln gases, comprising two vertical rows of cyclone-type separators each having a lateral gas inlet opening, a gas outlet opening on the top of the separator and a material discharge pipe extending downward from the bottom of the separator, gas conduit means interconnecting the inlet opening of each separator—with the exception of the lowermost separator of one of the rows—with the outlet opening of an individual separator of the other row, a gas conduit means connected to the inlet opening of said lowermost separator to supply hot kiln gases thereto, said separators and said conduit means forming together a single series defining a continuous and upwardly directed gas-flow path, each of said material discharge pipes—with the exception of that of said lowermost separator—extending from above into the gas conduit means leading to the gas inlet opening of the next preceding separator of the series, each two separators located in different rows being mounted in approximately the same elevation, each of said two separators having a major portion of its vertical height located in overlapping relation to the other separator, said gas conduit means between said two separators extending from one to the other row entirely in a substantially horizontal direction and at a height near the respective tops of the two separators.

2. Apparatus for heating pulverulent material, such as cement raw material, by hot kiln gases, comprising two vertical rows of cyclone-type separators each having a lateral gas inlet opening, a gas outlet opening on the top of the separator and a material discharge pipe extending downward from the bottom of the separator, gas conduit means interconnecting the inlet opening of each separator—with the exception of the lowermost separator of one of the rows—with the outlet opening of an individual separator of the other row, a gas conduit means connected to the inlet opening of said lowermost separator to supply hot kiln gases thereto, said separators and said conduit means forming together a single series defining a continuous and upwardly directed gas-flow path, each of said material discharge pipes—with the exception of that of said lowermost separator—extending from above into the gas conduit means leading to the gas inlet opening of the next preceding separator of the series, each two separators in the respective rows being mounted in approximately the same elevation, each of said two separators having a major portion of its vertical height located in overlapping relation to the other separator, said gas conduit means between said two separators comprising a vortex head mounted on the top of the lower separator and a conduit tangentially joined with said vortex head and leading to the gas inlet opening of the other separator, said latter conduit extending from said vortex head to said latter inlet opening entirely in a substantially horizontal direction, and each of said two separators being vertically spaced from the adjacent separator of the same row a distance smaller than the height of said individual separators.

3. Apparatus for heating pulverulent material such as cement raw material by hot gases, comprising a kiln, a plurality of separators mounted above said kiln, said separators being spaced vertically and horizontally from each other and arranged in groups of two, the two separators of each group being mounted at approximately the same elevation and having most of their respective vertical heights in overlapping relation to each other, each separator having a lateral gas inlet and a vertical gas outlet, a material discharge pipe extending downwardly from the bottom of each separator, a first gas conduit extending from said kiln to the lateral gas inlet of the lowermost separator, a second gas conduit extending horizontally from the vertical gas outlet of the lowermost separator to the lateral gas inlet of a second separator, said lowermost separator and said second separator forming one of said groups, a third gas conduit extending from the vertical gas outlet of the second separator upwardly to the lateral gas inlet of a third separator, a fourth gas conduit extending horizontally from the vertical gas outlet of the third separator to the lateral gas inlet of a fourth separator, said third and fourth separators forming another one of said groups, a material supply pipe extending into the conduit leading to the gas inlet of the uppermost separator, the material discharge pipe of each separator, except the lowermost separator, extending downwardly into the conduit leading to the gas inlet of the next lower separator and having a discharge opening within said latter conduit, the material discharge pipe of the lowermost separator extending downwardly into the kiln, and each of said pipes having sealing means for preventing the gas from passing upwardly through said pipe.

4. Apparatus for heating pulverulent material such as cement raw material by hot gases, comprising a kiln, a plurality of separators spaced vertically and horizontally from each other and arranged in groups of two, the two separators of each group being mounted at approximately the same elevation and having most of their respective vertical heights in overlapping relation to each other, each separator having a lateral gas inlet and a vertical gas outlet, a material discharge pipe extending downwardly from the bottom of each separator, a first gas conduit extending from said kiln to the lateral gas inlet of the lowermost separator, a vortex head adjacent to the vertical gas outlet of the lowermost separator, a second gas conduit extending over its entire length horizontally from said vortex head to the lateral gas inlet of a second separator, a third gas conduit extending from the vertical gas outlet of a second separator upwardly to the lateral gas inlet of a third separator, another vortex head adjacent to the vertical gas outlet of the third separator, a fourth gas conduit extending over its entire length horizontally from said other vortex head to the lateral gas inlet of a fourth separator, a material supply pipe extending into the fourth gas conduit, the material discharge pipe of each separator, except the lowermost separator, extending downwardly into the conduit leading to the gas inlet of the next lower separator and having a discharge opening within said latter conduit, the material discharge pipe of the lowermost separator extending downwardly into the kiln, and each of said pipes having sealing means for preventing the gas from passing upwardly through said pipe.

5. Apparatus for heating pulverulent material, such as cement raw material, by hot kiln gases, comprising two vertical rows of cyclone-type separators each having a lateral gas inlet opening, a gas outlet opening on the top of the separator and a material discharge pipe extending downward from the bottom of the separator, gas conduit means interconnecting the inlet opening of each separator—with the exception of one of the lowermost separators of the respective rows—with the outlet opening of an individual separator of the other row, a gas conduit means connected to the inlet opening said one separator to supply hot kiln gases thereto, said separators and said conduit means forming together a single series defining a continuous upwardly directed gas-flow path, each of said material discharge pipes—with the exception of that of said one separator—extending from above into the gas conduit means leading to the gas inlet opening of the next preceding separator of the series, each two separators in the respective rows being mounted in approximately the same elevation, each of said two separators having a major portion of its vertical height located in overlapping relation to the other separator, said gas conduit means between said two separators having a horizontal conduit extending from one row to the other and being in communication with the inlet opening of one of said two separators, said horizontal conduit having an outer wall portion approximately tangential to said one separator and having an inner wall portion closer to the vertical axis of said one separator than said outer wall portion, and the one material discharge pipe that extends into said latter conduit means having a discharge opening located within said horizontal conduit in an off-center position close to said inner wall portion.

References Cited in the file of this patent

UNITED STATES PATENTS

| | | |
|---|---|---|
| 1,315,254 | Stevens | Sept. 9, 1919 |
| 2,391,863 | Bowen | Jan. 1, 1946 |
| 2,648,532 | Muller et al. | Aug. 11, 1953 |
| 2,663,560 | Muller et al. | Dec. 22, 1953 |
| 2,750,182 | Petersen | June 12, 1956 |